UNITED STATES PATENT OFFICE.

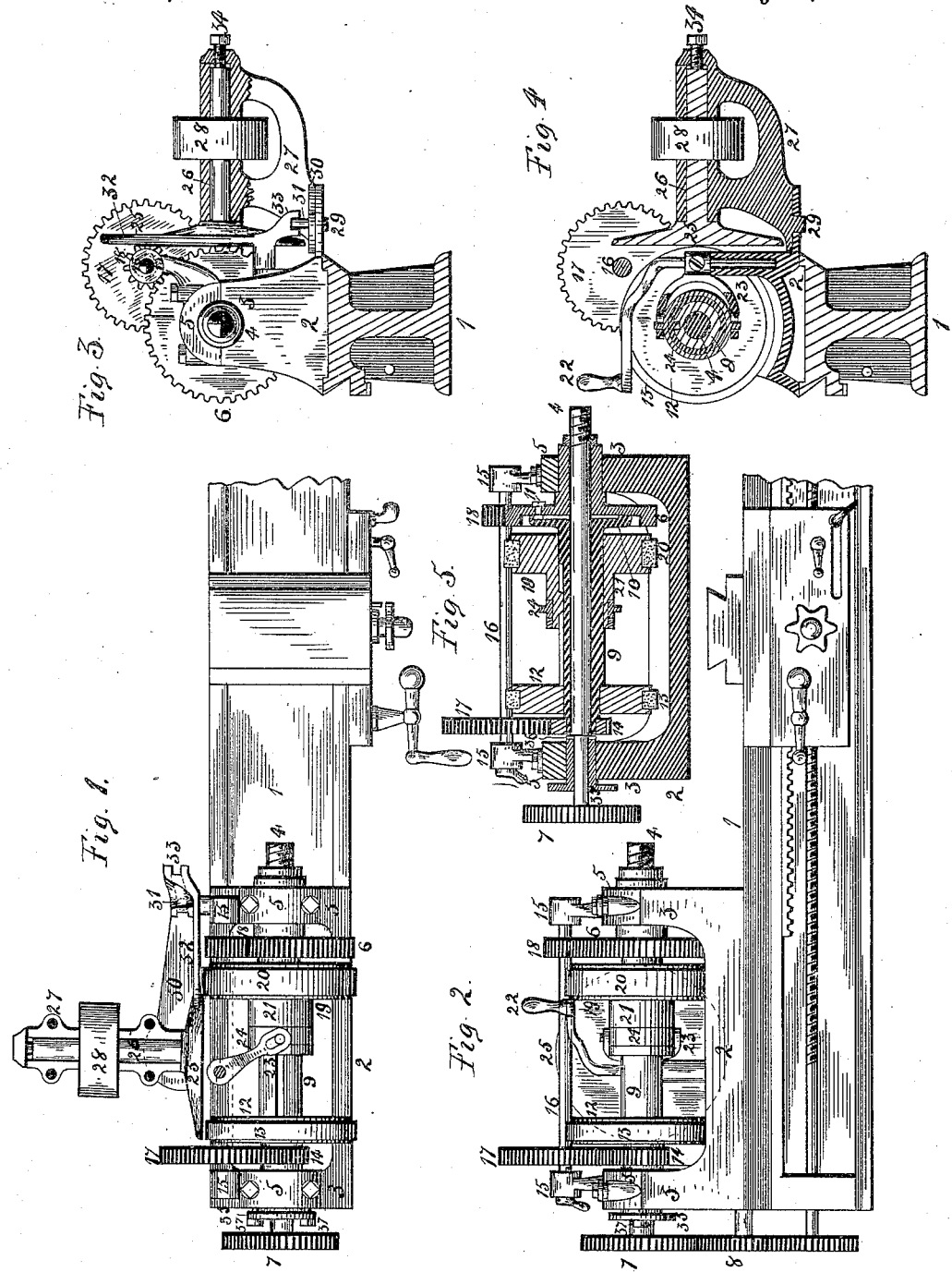

WILLIAM F. BARNES, OF ROCKFORD, ILLINOIS, ASSIGNOR TO THE W. F. & JOHN BARNES COMPANY, OF SAME PLACE.

LATHE.

SPECIFICATION forming part of Letters Patent No. 427,495, dated May 6, 1890.

Application filed November 14, 1889. Serial No. 330,248. (No model.)

*To all whom it may concern:*

Be it known that I, WILLIAM F. BARNES, a citizen of the United States, residing at Rockford, in the county of Winnebago and State of Illinois, have invented certain new and useful Improvements in Lathes, of which the following is a specification.

The object of this invention is to construct a lathe in which the live-spindle is driven by friction and the speed of which can be varied without stopping its revolutions.

In the accompanying drawings, Figure 1 is a plan view of a lathe, showing the friction mechanism for driving the live-spindle. Fig. 2 is a side elevation of the same. Fig. 3 is an end elevation of the same. Fig. 4 is a transverse section through the friction-disk that drives the live-spindle. Fig. 5 is a lengthwise central section through the head-stock.

I have not deemed it necessary to show or describe the construction of a tail-stock, as any of the known constructions may be employed.

The bed 1 of the lathe is of the usual construction, fitted with guideways for a tool-carriage. Upon the bed is located a head-stock consisting of the base portion 2, with bearings 3 rising from both ends. A live-spindle 4 is held in the bearings 3 by caps 5 in such manner as to permit it to revolve. The end of the spindle is screw-threaded to receive a face-plate or chuck and has a toothed wheel 6 pressed or otherwise secured to the spindle, by which it is rotated, and upon its other end is pressed a toothed wheel 7, and through the medium of an intermediate wheel 8 drives the screw-shaft which moves the tool-carriage.

Upon the spindle 4 is fitted a tubular shell 9, having its end next the toothed wheel 6 provided with a flange 10, which at pleasure can be connected to the toothed wheel 6 by the bolt 11, as shown at Fig. 5, and when connected will revolve together. A friction-wheel 12, in this instance having its face 13 of elastic material—such as leather, rubber, or vulcanized fiber—is pressed or otherwise secured to the shell 9, as is also a small toothed wheel 14. The caps 5 have supports 15 rising therefrom, and in which is held a short shaft 16, having a gear-wheel 17, meshing with the teeth of the small toothed wheel 14. A small toothed wheel 18 is also connected with the shaft, and its teeth mesh with the teeth of the wheel 6, secured to the spindle 4. By this arrangement I back-gear or run the spindle at a reduced velocity than when driven direct, as will be hereinafter set forth.

In the drawings I have shown the usual eccentric for throwing the gear-wheels 17 and 18 out of engagement with the gear-wheels 6 and 14, and as such construction is old I do not lay claim to the same. A friction-wheel 19 also has its face 20 of elastic material, and its hub 21 has a splined connection with the shell 9, so as to revolve therewith, and also capable of an endwise sliding movement.

A hand-lever 22 is connected with a yoke 23, which has a connection with a collar 24, loosely mounted on the hub of the wheel 19, and by means of which the wheel is moved endwise, for a purpose to appear hereinafter.

The mechanism for driving the spindle consists of a friction plate or disk 25, secured to a shaft 26, that is supported in a movable frame 27. Upon the shaft 26 is secured a pulley 28, which has a belt-connection with the line-shafting. The frame 27 has a pivotal connection with the bed of the head-stock at its inner end, as shown at 29, Fig. 4, by which it is capable of a slight oscillatory movement. An arm 30 extends forward and laterally from the base of the frame 27 and has a stud 31 rising from its outer and upper face.

To the rear side of the inner bearing 3 is pivoted a lever 32 for imparting an oscillatory movement to the frame 27. This is accomplished by means of the lower spirally-grooved end 33 of the lever 32 engaging the stud 31, and as the lever is moved in one direction the frame will be correspondingly oscillated, and when moved in the opposite direction the frame will be returned to its former position. This friction plate or disk 25 is so located with relation to the friction-wheels 12 and 19 that as the frame carrying the disk is oscillated the disk will be brought to bear against one or the other of the friction-wheels, or may be made to stand off from both wheels. If the disk 25 be moved so that its face engages the face of the friction-wheel 19, the said wheel being connected to the toothed wheel 6 by the devices before described, and the back gearing thrown out of action, and the wheel in position shown at Fig. 1, the chuck or face-plate carried by the live-spindle will be removed with the greatest velocity; but by sliding the wheel 19 toward the center of the disk 25 a slower motion is obtained until the center of the disk is reached, where the wheel will stand still. By this arrangement I can obtain a greater range of speed than has heretofore been accomplished and with less parts. When the disk is moved so that its face engages the face of the wheel 12, the spindle will be revolved in the opposite direction and the movement will be very quick, and when a slow-formed movement is required for heavy work the flange 10 must be disconnected from its engagement with the toothed wheel 6. As the shell 9 and spindle revolve with different speeds, the back gearing will then be thrown into mesh, as before described. An adjusting-screw 34 is screw-threaded into the end of the outer bearing of the frame 27 and comes in contact with the end of the shaft 26, and by means of which the friction-contact between the disk and friction-wheels can be varied at pleasure to give the required driving-power.

By the above construction I am able to drive the live-spindle with just power enough. Should the tool engage a hard substance which if forced would break the tool or injure the work, the friction-contact would give, thereby stopping the rotation of the work.

An adjustable bushing 35 is placed in the outer bearing 3 of the bed of the head-stop, which comes in contact with a shoulder 36 of the live-spindle, and by turning up the set-screws 37 the spindle is held from end shake by taking up the wear.

It is evident that good results might be obtained by having the face of the friction-wheels made of metal to revolve in contact with the metallic face of a friction-disk, or the face of the disk might be covered with elastic material and still be within the scope of my invention.

I claim as my invention—

1. In a lathe, the combination of a driving-shaft, a friction-disk thereon, a live-spindle, and a friction-wheel splined thereon capable of a sliding movement, substantially as set forth.

2. In a lathe, the combination of a live-spindle, two friction-wheels, each capable of driving the spindle, and a friction-disk capable of being thrown into engagement with each of said wheels, substantially as set forth.

3. In a lathe, the combination of a live-spindle, two friction-wheels, each capable of driving the spindle, a friction-disk capable of being thrown into engagement with each of said wheels, and means for imparting movement to said disk, substantially as set forth.

4. In a lathe, the combination of a live-spindle, two friction-wheels, each capable of driving the spindle, one of said wheels having a sliding movement, and a friction-disk capable of being thrown into engagement with each of said wheels, substantially as set forth.

5. In a lathe, the combination of a live-spindle, two friction-wheels, each capable of driving the spindle, a driving-shaft mounted in a frame capable of an oscillatory movement and having a friction-disk and driving-pulley connected therewith, said disk thrown into engagement with each of said wheels by oscillating the frame, and means for oscillating the frame, substantially as set forth.

6. In a lathe, the combination of a live-spindle and mechanism for rotating the spindle, consisting of a disk and wheel having a friction engagement with each other, the disk capable of being thrown out of engagement with the wheel, thereby stopping the rotation of the spindle, substantially as set forth.

WILLIAM F. BARNES.

Witnesses:
A. O. BEHEL,
E. BEHEL.